April 7, 1970     T. KOZOWYK ET AL     3,504,930
TORSION BAR ACTUATING SYSTEM
Filed Oct. 4, 1967     3 Sheets-Sheet 1
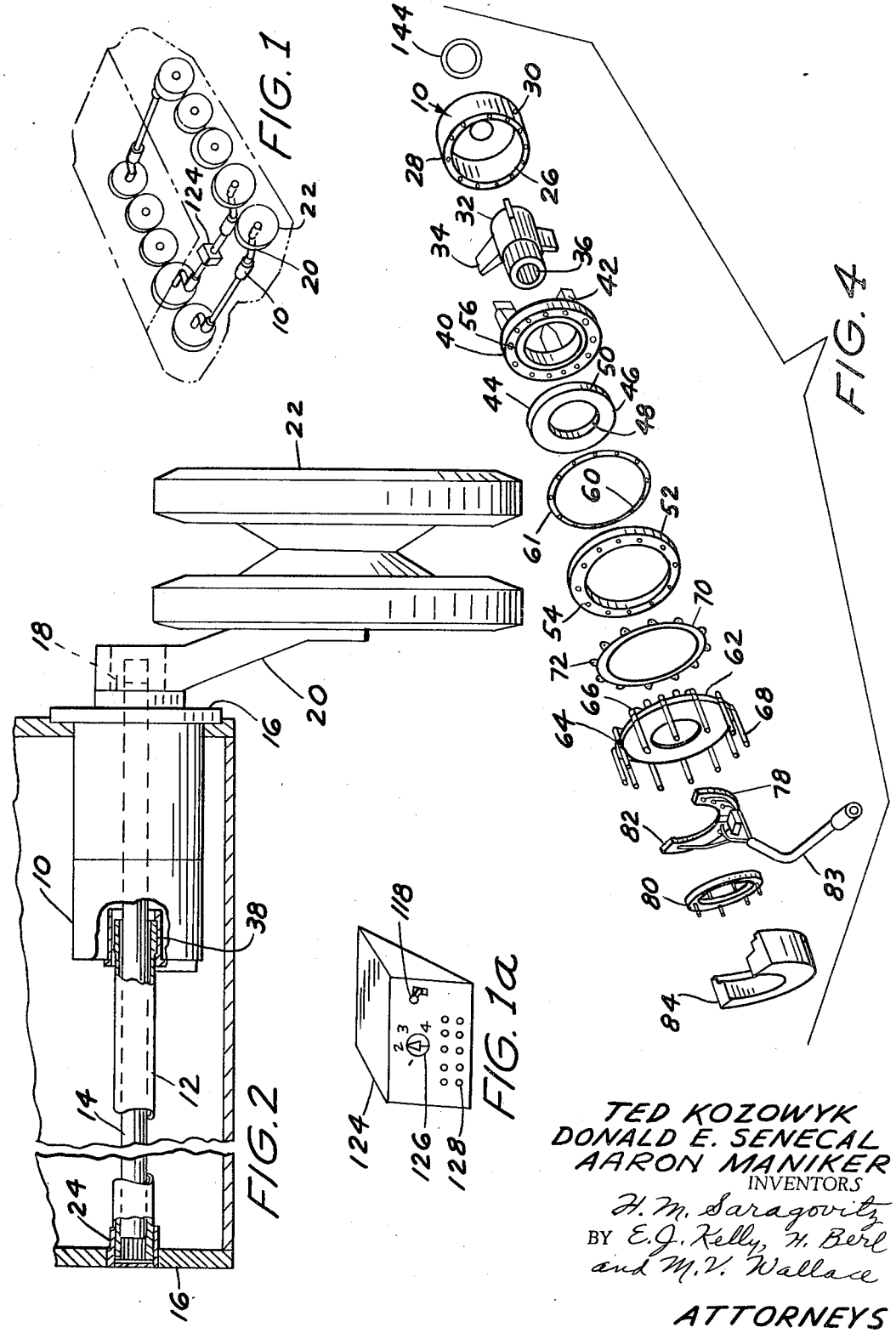
TED KOZOWYK
DONALD E. SENECAL
AARON MANIKER
INVENTORS
BY H. M. Saragovitz
E. J. Kelly, H. Berl
and M. V. Wallace
ATTORNEYS April 7, 1970   T. KOZOWYK ETAL   3,504,930
TORSION BAR ACTUATING SYSTEM
Filed Oct. 4, 1967   3 Sheets-Sheet 2

TED KOZOWYK
DONALD E. SENECAL
AARON MANIKER
INVENTORS

BY H. M. Saragovitz
E. J. Kelly, H. Berl
and M. V. Wallace
ATTORNEYS

United States Patent Office 3,504,930
Patented Apr. 7, 1970

3,504,930
TORSION BAR ACTUATING SYSTEM
Ted Kozowyk, Detroit, and Aaron Maniker, Southfield, Mich., and Donald E. Senecal, Cincinnati, Ohio, assignors, by direct and mesne assignments, to the United States of America as represented by the Secretary of the Army
Filed Oct. 4, 1967, Ser. No. 672,938
Int. Cl. B60g 7/00, 17/00
U.S. Cl. 280—124                    1 Claim

ABSTRACT OF THE DISCLOSURE

An apparatus for actuating and controlling the variable vehicle ground clearance of tracked or wheeled vehicles having torsion bar and tube springing media.

---

The torsion bar actuating system disclosed herein consists of ten torsion bar actuating units, one for each roadwheel, an hydraulic subsystem, and an electrical control system. The actuating device units are operated by hydraulic directional-control valves. Control of the valves is effected by the electrical subsystem which automatically energizes the proper solenoids depending upon the actuator function required to achieve the vehicle position selected by the operator.

In the past multi-wheel vehicles have been designed for use as battle tanks, gun carriers, troop carriers, or the like, wherein, within applicants' knowledge, the top ground clearance has been fifteen or sixteen inches, which height has not proven too successful especially on uneven terrain or muddy ground.

This torsion bar actuating system is capable of elevating and lowering a forty-five to fifty ton tracked vehicle in order to vary the vehicle's ground clearance. Four vehicle positions are obtainable; full up for maximum ground clearance to improve the vehicle's mud-crossing capability and cross-country mobility; full down for minimum ground clearance to provide a low combat silhouette and to facilitate shipment and two intermediate ground clearance positions for normal vehicle operation.

The principal object of the present invention is to provide a new and improved height control actuator for multi-wheeled vehicles, which in turn provides greater ground clearance than formerly obtained, and which allows the vehicle to pass over obstacles of greater height than can be traversed with known multi-wheeled vehicles, and by means of which the wheels are raised or lowered to pre-determined heights simultaneously.

Another object of the invention is to provide a new and improved device by which the roadarm cant or pitch can be changed, causing the vehicle silhouette to be raised or lowered by selectively raising or lowering any combination of vehicle wheels whether back or front or those located in staggered opposed relationship on either side of the vehicle.

A further object is to provide automatic positioning of each actuator unit even though the actuators may be under different loads due to uneven terrain provided the individual loads are not greater than the output capability of the actuator.

A still further object is to provide a system whereby the operator need only select the position desired on a four position selector switch. Additional manual manipulations are not required thereby decreasing the possibility of operator error in sequestering.

Another object of the invention is to provide a fail-safe system which will automatically engage a vehicle elevation system integral-locking device upon power failure during raising or lowering of the vehicle.

The above and other objects of the invention will appear more fully from the following more detailed description, and from the drawings, wherein:

FIG. 1 is a view of a tank hull, partly broken away, to show the wheel suspension of same and the manner in which the actuators are secured to the roadarms and wheels, and a control panel;

FIG. 1A shows a control panel;

FIG. 2 is a perspective view showing how the actuator is secured to the housing and to the torsion tube and how the roadarm and wheel are secured to the spindle and torsion bar;

FIG. 4 is an isometric exploded cut-away view of the actuator;

Figure 3:
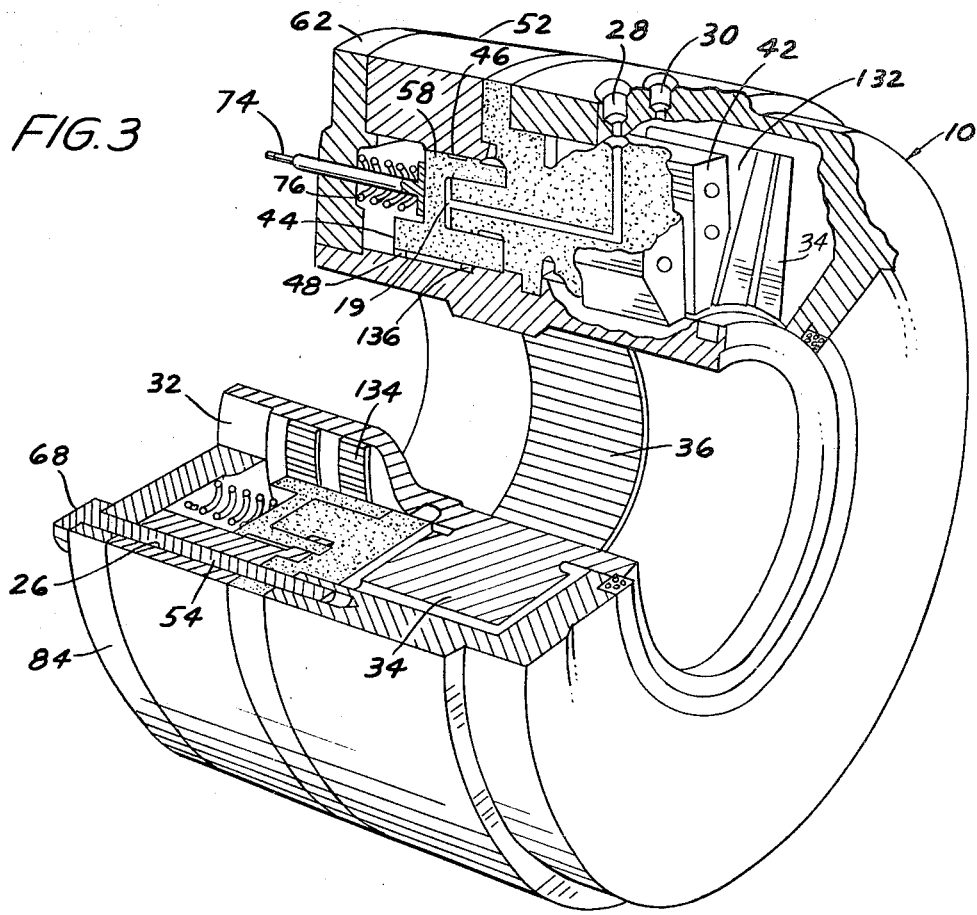
FIG. 3 shows the actuator partly broken away.

Referring now to the drawings in detail wherein like reference characters designate like or corresponding parts throughout the several views, there is shown in FIG. 2 an actuator housing 10, the same being mounted upon a torsion tube 12 which has inserted therethrough a torsion bar 14, said torsion tube being supported within the opposed sides of a tank hull 16, one end of same being secured to a spindle 18 to which is rotatably secured a roadarm 20 which in turn rotatably supports a roadwheel 22. The other end of torsion tube 12 is journaled, as at 24, in the opposed side of hull 16 from spindle 18.

The actuator per se comprises a housing 10 of steel, or the like, having assembly holes 26, FIG. 3, formed therein together with one hydraulic lock-out port 28 and three rotary actuator ports 30 spaced equally upon the outer periphery of housing 10 to allow the passage of oil by means of conduits, not shown, into housing 10.

A hub or rotor member 32 is provided, the same having formed thereon three vane members 34 and internal splines 36 which in turn are adapted to mate with splines 38 on torsion tube 12. Spaced apart splines 134 are provided on rotor 32. An open-faced stator member 40 is provided, the same being adapted to be secured to housing 10 by bolts sealed in holes 26. The stator 40 has three stationary vanes 42 secured thereto, said vanes being adapted to slip over rotor 32 so that vanes 34 will sweep about concentrically within stationary vanes 42 when vanes 34, 42 are seated within housing 10. A coupler ring member 44 is provided, the same being formed with exterior splines 46 and interior splines 48 and also having a circumferential cavity 50 formed therein for a purpose later to be described. A ring member 52 is also provided having bolt holes 54 therein to mate with holes 56 in stator 40 and internal splines 48 to receive coupler 44 and hold same against rotation. A gasket 60 is provided, the same having bolt holes 61 therein, to act as an oil seal between stator 40 and ring 52. A cover member 62 is provided having bolt holes 64 therein to match with holes 54 in ring 52 and having a plurality of circumferentially spaced spring members 66 protruding laterally therefrom. Numeral 68 designates bolt members for securing plate 62 to ring 52, stator 40 and housing 10. A gasket 70 having holes 72 is provided to fit between end plate 62 and ring 52 as an oil seal. A plunger assembly 74 is provided, FIG. 3, and is mounted in cover 62, the same being adapted to move axially through the cover 62 when coupler 48 is moved axially to the left toward the cover—the plunger being surrounded by a spring member 76.

A rotary movement control mechanism is provided, the same comprising a series of limit switches 78, FIG. 4, and an actuating cam 80, said switches being affixed to a plate 82 mounted on a cover 84. Numeral 83 represents an electrical conduit to actuate electrical switches.

Figure 7:
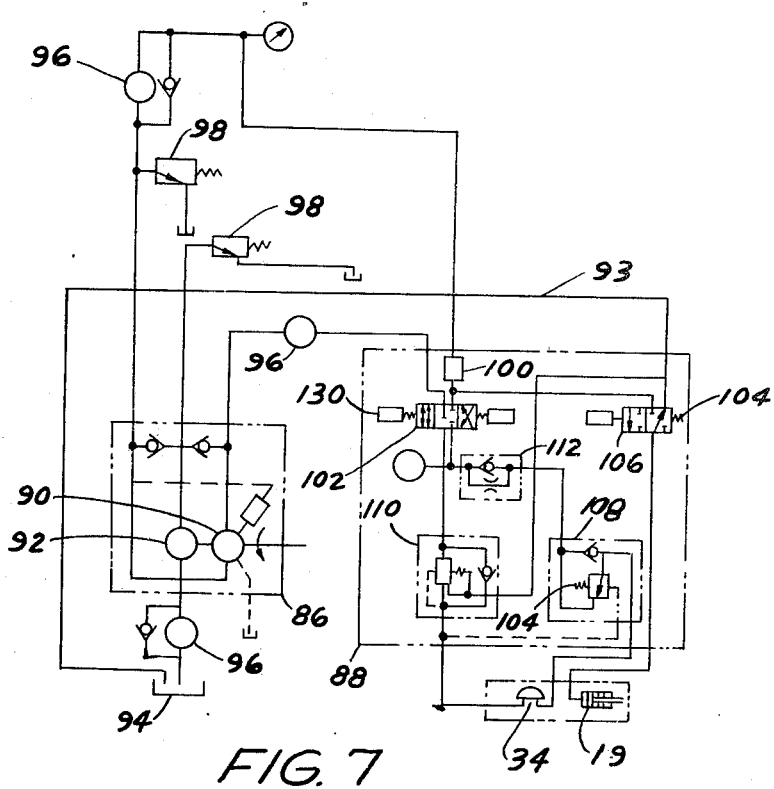
FIG. 7 is an hydraulic schematic diagram for the suspension unit.

To supply hydraulic power to each torsion bar actuator to unlock the locking mechanism and to rotate the rotary actuator, an hydraulic subsystem is provided comprising a power supply system 86, FIG. 7; a closed loop control system 88 for driving the rotary actuator and an open return control system from the locking mechanism 19. The hydraulic power requirement is supplied by a power take-off driven piston type presure compensated pump 90 mounted on the rear of the vehicle's transmission, not shown. Integrally contained within the pump housing is a smaller pump 92, said pump being an internal gear type to supply fluid to the system at a reduced pressure.

An hydraulic fluid reservoir 94 is located within the vehicle along with three 10-micron filters 96 and a relief valve 98, the same being installed in the main hydraulic closed loop control system outlet. The closed loop control system 88 for driving the actuator 10 comprises an hydraulic valve panel containing an inlet control valve 100, a solenoid operated directional control valve 102 and a pressure switch 104, a solenoid operated unlocking valve 106, a counter balance valve 108, a pressure reducing valve 110 and a vehicle "Down" flow control valve 112.

Figure 5:
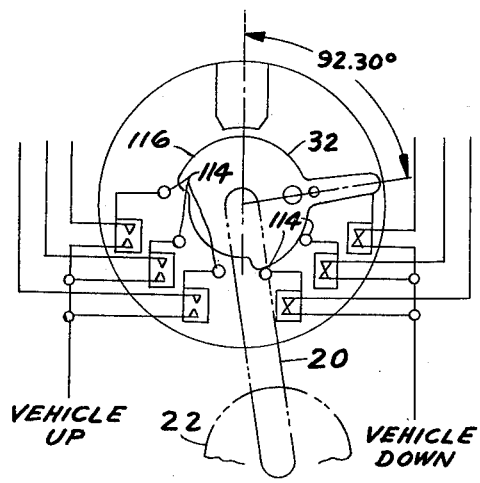
FIG. 5 is a schematic diagram of the roadwheel positions and sensing device operation for vehicle positions.

An actuator sensing device is provided, the same comprising limit switches 114, FIG. 5, and a limit switch cam 116 which is installed on and attached to rotor hub 32.

The numeral 118 designates a master power switch, the same being in the form of a toggle switch which in turn controls all electrical power for the system. The same must be "on" before the system can operate, FIG. 1A.

Numeral 126 designates a vehicle position selector switch, the same comprising a four position rotary type switch to provide the operator a choice of four vehicle heights—the same being turned manually to the desired vehicle position after master power has been made available.

An unlock indicator light 128 is provided, the same comprising a small designating light one for each actuating unit or ten in all. Each light has its own current-limiting resistor and a unit in an unlocked state will cause its indicator to light. The light will extinguish when its corresponding unit has relocked. The vehicle is unsafe to operate if more than two lights on one side of the vehicle remain "on" and a new vehicle position may be selected at any time regardless of the condition of the indicator light.

The manner in which the device operates is as follows:

The system has incorporated therein well-known controls both manual and automatic and the operator's responsibility is limited to basic control and monitoring functions which are accomplished through employment of a control panel and gages and the torsion bar actuating units, one for each roadwheel. The actuating units are operated by hydraulic power which is controlled by solenoid-operated, hydraulic directional control valves. Control of the valves is effected by an electrical subsystem which automatically energizes the proper solenoids depending upon the actuator function required to achieve the vehicle position selected by the operator.

To start the system the operator turns on the master switch, not shown, which in turn supplies electrical power from batteries, not shown, to the control panel 124. The operator then turns the height selector switch 126 to a high position which in turn initiates operation of the system. The unlock indicator lights 128 are "on" when the corresponding actuating units are unlocked. When unlock indicator lights 128 are "off" the desired vehicle height has been attained and units are re-locked in the new position. When all lights are "out," the main power switch may be turned off and the engine returned to idling speed before engaging forward or reverse gear.

The elapsed time to raise or lower the vehicle from the lowest to the highest positions is approximately ten to twenty seconds. After the master power switch is turned "on" and the desired vehicle road clearance height is selected by rotating the vehicle position selector switch 126 to a higher position, the operation of the system automatically continues until each individual actuator unit is relocked in the new actuator position.

Initially the relay in the master relay box corresponding to the position selected will energize supplying a signal to each of the ten actuator sensing devices. This position signal is fed to its corresponding position-sensing limit switch or pair of switches on each actuator. If the actuators were in the selected position the sensing limit switch or switches would be open and the actuator would remain locked in position. Since the actuator is not in the selected position, the position signal will be fed through sensing limit switch 114, FIG. 5, to the "up" drive circuitry to actuate the "up" solenoid 130, FIG. 7, of the directional control valve 102.

As fluid begins to flow through the directional control valve 102 hydraulic pressure in the rotor chamber 132, FIG. 3, increases, removing the load of vehicle weight from the locking splines 134 of the actuator unit in actuating the "up" system hydraulic pressure sensing switch, not shown. The actuating switch, not shown, allows a signal to be fed to the unlock relay coil in the diode and relay box and to the unlock valve solenoid 106, FIG. 7.

Energizing unlock valve solenoid 106 allows the flow of fluid to the hydraulic pressure chamber 19 side of the annular coupler 44 which pushes and holds the coupler's locking splines 134 out of engagement by compressing the springs 66, 76, on the opposite face of the coupler 44. Loss of the electrical signal through the pressure switch, not shown, to the unlocking solenoid 106, due to the sudden pressure drop in the system when the coupler is actuated, is prevented by the unlock relay, not shown. As the coupler 44 moves toward the cover 62, the plunger assembly 74, FIGS. 3 and 6, deactivates switch 138, FIG. 6, which is normally in a closed or actuated condition which energizes the corresponding unlock indicator light, not shown, on the control panel and also actuates the pulser unit, not shown.

Figure 6:
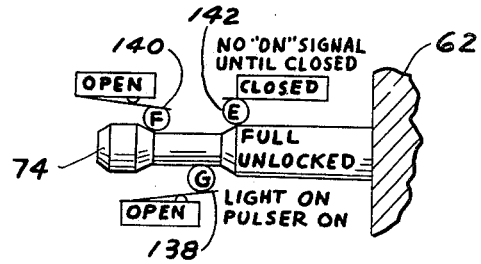
FIG. 6 shows the switch operation during locking and unlocking.

As the locking splines 134, become fully disengaged, the movement of the plunger assembly's cam 74 deactivates switch 140, FIG. 6, and actuates switch 142, which allows the "up" signal to be fed to the "up" solenoid 130 of the directional control valve 102 and the unlock solenoid valve 106, FIG. 7. The blocking diodes, not shown, prevent the "up" signal from being fed back through the closed switches of the "down" positions not being utilized.

Energizing of the "up" solenoid 130 of the directional control valve 102, FIG. 7, allows fluid to flow to the rotor chamber 132, FIG. 3, thus increasing chamber pressure and causing rotation of rotor 32. Rotor rotation increases torsion bar 14 wind-up, raising the vehicle and also rotating the position sensing limit switch cam 80. When the selected position is achieved, the position-sensing limit switch 114, FIG. 5, opens, which in turn deactivates the directional control valve 102, FIG. 7, and rotor rotation ceases. The circuit to the holding relay is interrupted which deactivates the unlock valve 106, FIG. 7, thus allowing the springs 66 to push the coupler 44 splines 136, FIG. 3, into engagement with the splines 134 on rotor 32. Since the spring pressure is insufficient to overcome the friction created by the vehicle weight on the locking splines 134, 136 only partial engagement may occur.

If full engagement is not achieved, switch 138, FIG. 6, keeps the pulser unit, not shown, in operation until the splines 134, 136, are fully engaged. Switch 138 also allows the pulser "output" signal to be fed to the "up" solenoid 130 of the directional control valve 102, FIG. 7. This pulser signal, which occurs at pre-set time intervals to give maximum spline movement per pulse, allows small amounts of fluid to enter the "up" side of the rotor chamber 132, FIG. 3, thereby jogging the rotor 32 sufficiently to remove the vehicle weight from the locking splines 134, 136, so that the splines can become fully re-engaged.

Return movement of the plunger assembly 74, simultaneously with the engagement of the locking splines 134, 136, causes switch 142, FIG. 6, to actuate at full engagement which in turn deactivates the pulser unit, not shown, and the actuator units unlock indicator lamp, not shown.

When all unlocked indicator lamps are de-energized the vehicle is at the selected height and safe to operate. Normally the vehicle is safe to operate if not more than two lights on one side of the vehicle remain "on." The operator may now continue with the operator's control functions.

To lower the vehicle the operator first activates the master switch and rotates vehicle height selector switch 126 to the desired lower position. This causes fluid to flow to the "up" side of the rotor 32 even through the "down" position was selected, unloading the splines 134, 136, and allowing the annular coupler 44 to be disengaged from the outer splines 134 on hub 32 of the rotor 32 by fluid directed to the coupler oil pressure chamber 19 from the unlocking valves 106, FIG. 7. Once the splines 134, 136, are completely disengaged, the directional control valve 102, FIG. 7, accepts the "down" signal selected and is shifted so as to direct fluid to the down side of the actuator. The unit will rotate downwardly until the proper limit switches are actuated, then flow to the down side of the actuator and stop and the jogging of fluid to the "up" side will proceed until the splines 134, 136, are completely engaged. At this point the desired position will have been attained.

There has been disclosed herein a torsion bar actuating system actuated by hydraulic power which in turn is controlled by solenoid-operated hydraulic directional control valves. The control of the valves is effected by an electrical sub-system which in turn automatically energizes the proper solenoids depending upon the actuator function required to achieve the vehicle position selected by the operator. The system is capable of elevating and lowering tracked vehicles in order to vary the vehicle's ground clearance.

We wish it to be understood that we do not desire to be limited to the details hereabove described and shown in the drawings, for obvious modifications will occur to a person skilled in the art.

We claim:

1. A variable height suspension system for a vehicle, comprising,
    a torsion bar within a torsion tube suspended beneath said vehicle,
    a roadarm mounted upon said torsion bar,
    a roadwheel rotatably mounted upon said roadarm,
    a fluid reservoir,
    fluid actuator means for raising and lowering said vehicle mounted upon said torsion tube,
    conduit means for transferring fluid from said reservoir to said actuator,
    said actuator means comprising a housing,
    a vaned rotor member mounted upon said torsion tube within said housing,
    a ring cavity coupler member adapted to move axially on said vaned rotor member comprising a set of interrupted splines on the inner side of said ring and full splines on the outer surface of said ring,
    whereby during locking operation the inner set of splines, to lock or unlock said vaned rotor member, has to be shifted only half of the distance to disengage the locked splines as compared to normal full length of spline movement to discharge same when lifting or powering said vehicle.

References Cited

UNITED STATES PATENTS

| | | | |
|---|---|---|---|
| 3,117,800 | 1/1964 | Magnuson | 280—124 |
| 3,246,405 | 4/1966 | Reynolds | 305—27 X |
| 3,262,522 | 7/1966 | Johnson | 180—9.2 X |
| 3,352,565 | 11/1967 | Reynolds | 180—9.2 X |
| 3,371,940 | 3/1968 | Sinclair | 180—9.2 X |

RICHARD J. JOHNSON, Primary Examiner

U.S. Cl. X.R.

180—9.2; 92—121, 24